United States Patent
Fiala et al.

(10) Patent No.: US 8,814,529 B2
(45) Date of Patent: Aug. 26, 2014

(54) BLADE FOR A TURBO DEVICE WITH A VORTEX-GENERATOR

(75) Inventors: Andreas Fiala, Munich (DE); Jochen Gier, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 678 days.

(21) Appl. No.: 13/054,768

(22) PCT Filed: Jul. 17, 2009

(86) PCT No.: PCT/DE2009/000998
§ 371 (c)(1),
(2), (4) Date: Apr. 15, 2011

(87) PCT Pub. No.: WO2010/009707
PCT Pub. Date: Jan. 28, 2010

(65) Prior Publication Data
US 2011/0182746 A1    Jul. 28, 2011

(30) Foreign Application Priority Data
Jul. 19, 2008   (DE) .......................... 10 2008 033 861

(51) Int. Cl.
*F01D 5/14*   (2006.01)

(52) U.S. Cl.
USPC ................................. 416/236 R; 416/223 A

(58) Field of Classification Search
CPC ................................. F01D 5/141; F01D 5/145
USPC .................. 416/235, 236 R, 223 A; 415/914; 244/200.1
See application file for complete search history.

(56) References Cited

U.S. PATENT DOCUMENTS

| 3,578,264 | A | | 5/1971 | Kuethe |
| 4,720,239 | A | * | 1/1988 | Owczarek ...................... 415/181 |
| 5,901,928 | A | * | 5/1999 | Raskob, Jr. .................... 244/204 |
| 6,358,012 | B1 | * | 3/2002 | Staubach .................. 416/236 R |
| 6,416,289 | B1 | | 7/2002 | Ramesh et al. |
| 2004/0028527 | A1 | * | 2/2004 | Kohli et al. ................. 416/97 R |

FOREIGN PATENT DOCUMENTS

| DE | 681 479 C | | 9/1939 |
| DE | 601 12 986 T2 | | 7/2006 |
| EP | 0 132 638 B1 | | 2/1985 |
| EP | 0 850 832 A1 | | 7/1998 |
| EP | 1 081 332 A1 | | 3/2001 |
| EP | 1 152 122 B1 | | 11/2001 |
| GB | 2032048 A | * | 4/1980 |
| GB | 2 436 861 A | | 10/2007 |

OTHER PUBLICATIONS

PCT/DE2009/000998 PCT/ISA/210.

* cited by examiner

*Primary Examiner* — Richard Edgar
(74) *Attorney, Agent, or Firm* — Crowell & Moring LLP

(57) ABSTRACT

A blade construction for a turbo device, preferably a blade array of a low-pressure turbine, is disclosed. On the inlet-side profile surface of the blade a vortex generator is arranged downstream from the speed maximum. The vortex generator is formed by a surface undulation with at least one wave, the wave tail of which runs in the form of a wave trough and/or a wave peak in the blade vertical direction.

8 Claims, 5 Drawing Sheets

BLADE FOR A TURBO DEVICE WITH A VORTEX-GENERATOR

This application claims the priority of International Application No. PCT/DE2009/000998, filed Jul. 17, 2009, and German Patent Document No. 10 2008 033 861.3, filed Jul. 19, 2008, the disclosures of which are expressly incorporated by reference herein.

BACKGROUND AND SUMMARY OF THE INVENTION

The invention relates to a blade construction with a vortex generator in the form of an at least partial surface property.

These types of blade constructions are found for example in rotors and blade arrays (rotor blades and/or guide blades) of low-pressure turbines of an aircraft propulsion device.

Influencing a flow, especially the boundary layer close to the surface, through a vortex generator (also called turbulators) is a much investigated topic at least on the level of research. Basically, the boundary layer originates from the wall friction of the flowing particles and forms the flow-related bridge between the profile and the ideal flow that is not affected by the wall friction at some distance from the profile wall being flowed around. The thickness of the boundary layer in this case is a function of the Reynolds number. This thickness of the boundary layer increases continuously with an increasing path length of the flow along the profile wall. Eventually the flow particles begin to abandon the laminar flow behavior (laminar boundary layer) and execute more or less strong lateral movements (turbulent boundary layer). The transition from the laminar boundary layer to the turbulent boundary layer (also called transition range) depends in this case on a series of influencing variables, among them the surface roughness of the profile wall being flowed around, pressure gradients, disturbances to speed and pressure of the outer flow as well as the local Reynolds number.

With a similar speed progression along the outer flow, a turbulent boundary layer generates more frictional resistance than a laminar boundary layer, but, in contrast, has a lower separation tendency. The frictional resistance and pressure distribution around the profile that is changed by the separation cause the profile loss. Such a separation of the boundary layer particularly on a profile upper side or inlet side essentially occurs when particles on flow paths in the boundary layer close to the profile wall cannot be decelerated any further because of flow energy that is too low. They yield laterally as a result and then a so-called separation bubble forms, as shown schematically in FIG. 1. With a dropping Reynolds number, the separation grows more and more in terms of its length until it reaches the area downstream from the rear edge of the profile so that the diversion required by the profile can no longer be achieved. In the lateral center downstream from the separation near the profile wall, no flow particle ever reaches the profile surface again; the flow can no longer follow the profile and breaks off so to speak.

In order to positively influence the break-off behavior of the flow along a profile and the profile loss by controlling the size of the separation bubble, various approaches for arranging fixed turbulators have been pursued in the prior art, all of which have the objective of allowing the laminar boundary layer to transition to a turbulent boundary layer further upstream on the profile. Two examples of these types of turbulators are depicted in the attached FIG. 2. Consequently, the possibility exists of generating turbulators by means of sharp-edged projections on the upper side of the profile or by means of sharp-edged notches (recesses) in the wall being flowed around.

However, in the case of guide blades and rotor blades of a turbo device in particular of a low-pressure turbine, sharp-edged turbulators configured in this way have proven to be disadvantageous insofar as they reduce the separation bubble in an advantageous way only at greater flying altitudes, for instance the cruising altitude an aircraft, because of the low flow Reynolds numbers there and high blade stress, by promptly making the flow turbulent and thereby improving the profile loss and the efficiency, but increase the losses near the ground. In addition, in the case of sharp-edged turbulators, manufacturing, coating and service life are extremely critical. As a result, currently there is no known practical application of turbulators in an engine.

In this regard, the inventor's European Patent Document No. EP 132 638 B1 is itself cited as relevant prior art with respect to the present invention. An axially traversed blade array of a turbine is known, whose blade profile is configured such that the flow is accelerated along the majority of the inlet-side profile surface up to a speed maximum in the region of the channel narrow surface and decelerated downstream from this up to the rear edge of the profile. Every blade is provided with an interference edge, which is arranged downstream from the speed maximum on the inlet side of the blade in the region of the decelerated flow and extends essentially over the entire blade height (distance from the blade root to the blade tip).

In order to reduce the negative effects cited at the outset of a sharp-edged turbulator on the main flow (increase in the frictional loss) particularly in the case of high Reynolds numbers, EP 132 638 B1 provides among other things for the interference edge to be profiled in a saw-toothed manner in a plane tangential to the profile surface. A reduction in the required edge height is supposed to be achieved by this in order to thereby reduce the frictional losses in the case of higher Reynolds numbers. Despite these positive effects, the problems of complicated manufacturing and lower service life remain unsolved.

In view of this prior art, the object of the present invention is creating a blade of a turbo device with a generic vortex generator (turbulator) which can be manufactured simply and has a longer service life.

This object is attained by a blade of a turbo device with an undulating (edgeless) vortex generator extending along the blade.

As a result, the invention is a blade construction of a turbo device, preferably of a blade array arrangement of a low-pressure turbine, on whose inlet-side profile surface downstream from the speed maximum, if applicable, also beginning in the region of the speed maximum, a vortex generator is arranged, preferably in the form a partial geometric surface property. The vortex generator is formed further preferably by a surface undulation with at least one wave, whose wave tail runs in the form of a wave trough and a wave peak approximately in the blade vertical direction.

Expressed more concretely, sharp-edged fixtures and modifications to the blade inlet side are dispensed with in order to promptly make the flow (boundary layer) turbulent. Instead one or more edgeless waves are arranged or configured on the surface of the inlet side. The advantage of doing this is that the manufacturability, coatability and service life of the blade are improved as compared to the known prior art. The effect of the undulating vortex generator on the flow behavior in the area near the surface is comparable to the known sharp-edged turbulators. With high Reynolds numbers in particular near the ground, however, a lower loss of efficiency from friction is observed. In addition, an acoustic reduction in engine noise of 1-2 dB can be realized, i.e., a 10-20% reduction in pressure amplitude.

An important advantage of the turbulator according to the invention is the direct manufacturability within the manufacturing process of a blade of a turbo engine. In the case of cast gas turbine blades, this surface property/structure may be integrated directly into the casting model without noticeable additional costs. However, subsequently introducing the wave structure according to the invention is also possible. This applies not only to new fabrication, but also to cases of overhauling. As a result, a retrofit is also possible. Forming processes as well as metal cutting processing methods, e.g., such as compression, grinding and/or milling but also electrochemical removal, can be used to subsequently introduce the wave structure.

The smooth wave shape according to the invention has more advantages as compared with the prior art such as, e.g., U.S. Pat. No. 6,416,289 or European Patent Document No. EP 1 081 332 A1, which describes a strip with increased roughness.

Because the roughness strip according to the prior art is a region with irregular, increased roughness, which is not produced in a normal fabrication process (for example with cast gas turbine blades), this roughness must be applied subsequently. In contrast, the smooth wave turbulators can be introduced directly during the normal fabrication process (the term "smooth" should be understood as a surface quality, which corresponds to the other areas of the turbine blade). An additional increase in roughness as compared with the remaining blade regions is not required for the wave turbulators.

Even the functionality of the wave turbulators according to the invention is basically different from locally increased roughness. If, with increased roughness, at least the peaks project from the layer of the constant shear stress gradient (near the wall), flows in the region of the maximum shear stress (transverse and longitudinal vortices) are generated in the boundary layer, which directly produce three-dimensional flow structures with premature transition (i.e., further upstream than without roughness). In contrast to this, the wave turbulators according to the invention stimulate instabilities in the boundary layer flow, which produce Görtler longitudinal vortices in the concave portion of the wavelength, without blending these with additional vortices. As a result, the disadvantageous effect of the wave turbulators with higher Reynolds numbers, such as those that occur, e.g., in engines near the ground, is less than with vortexing turbulators having a conventional design.

Furthermore, it has been shown that in a preferably long-wave embodiment, a targeted excitation of the boundary layer instability is achieved. For this purpose, the wavelength is put in a ratio of $\lambda/s_{ges}=0.05$ to 0.25 to the inlet side. The amplitude is put in a ratio of $a/s_{ges}=0.0002$ to 0.0040 to the inlet side length. The number of sinusoidal waves is preferably between 1 and 4 and is in a range of $\pm 0.25\ s/s_{ges}$ around the position of the narrow section on the inlet side of the blade. However, the optimum values within the aforementioned range depend in this case on the flow conditions like Reynolds number, Mach number, load, etc. The expression "$s_{ges}$" in this case means the inlet-side arc length, measured from the axially forwardmost forward edge point to the rearmost rear edge point.

Moreover, it is preferably possible that in a short-wave embodiment, a targeted excitation of instabilities is likewise achievable by means of frequencies with moderate excitation rates. For this purpose, the wavelength is put in a ratio of $\lambda/s_{ges}=0.005$ to 0.05 to the inlet side. The number of sinusoidal waves is then preferably between 2 and 15. The remaining settings correspond to the foregoing description.

In addition, it is advantageous to provide on a turbine blade ($Ma_{outlet}=0.65$ and $Re_{outlet}=200,000$) with presumably high stage load (deflection>100°) and high blade load (high lift, uncertainty value>1.0) 3 sinusoidal waves of wavelength $\lambda/s_{ges}=0.08$ with constant amplitude $a/s_{ges}=0.001$, whose last wavelength ends at the location of the laminar separation. The wavelengths in this case extend 20%-80% beyond the span width extension.

Alternatively, in this case the wavelength corresponding to a short-wave embodiment can also be $\lambda/s_{ges}=0.03$ with a turbine blade with $Re_{outlet}=400,000$.

Finally, in the case of a compressor blade ($Ma_{intake}=0.5$ and $Re_{intake}$ 0 300,000) with a laminar/turbulent separation bubble on the inlet side, this can be formed with three sinusoidal waves of wavelength $\lambda/x_{ges}=0.05$ with the same amplitude $a/x_{ges}=0.0002$, wherein its last wavelength ends at the location of the laminar separation. The expression "$x_{ges}$" here signifies the axial array width in the center section. The wavelengths also extend 20%-80% beyond the span width extension.

The invention is described in greater detail in the following on the basis of a preferred exemplary embodiment making reference to the accompanying drawings.

DETAILED DESCRIPTION OF THE DRAWINGS

Figure 1:
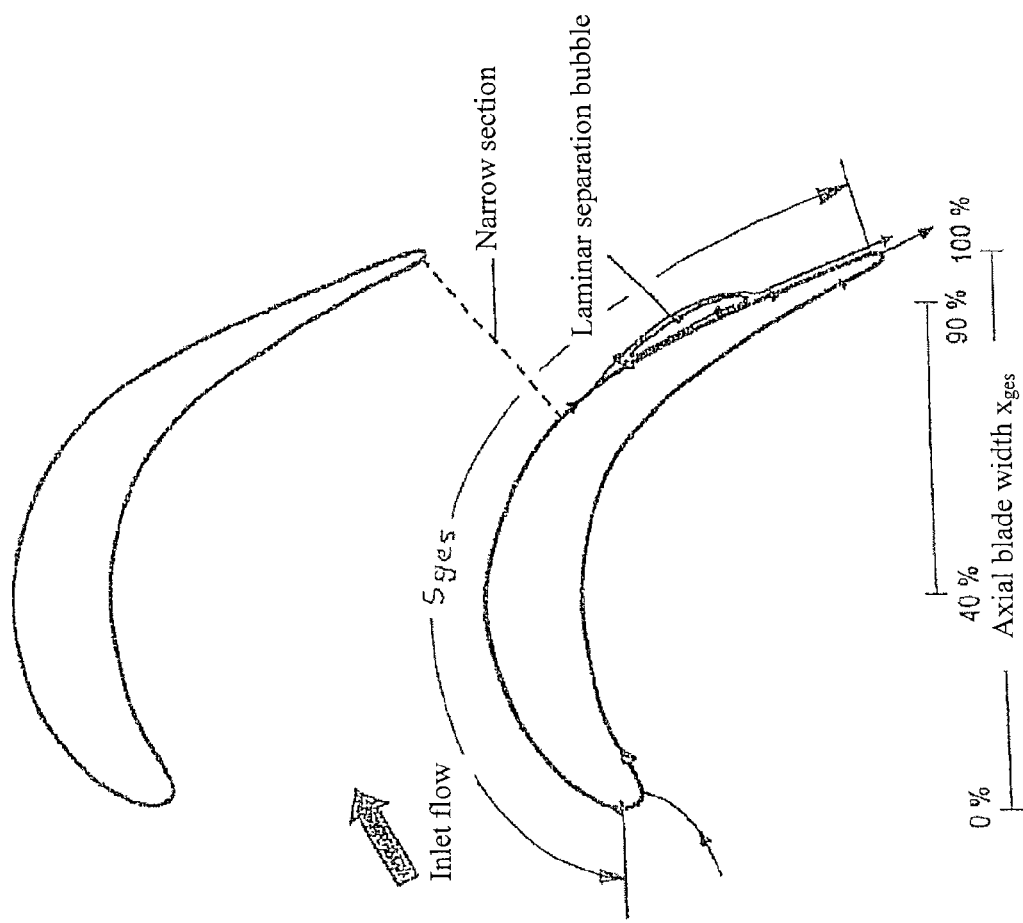
FIG. 1 shows an adjacent blade pair of a blade array according to the prior art without a vortex generator.
Figure 2:
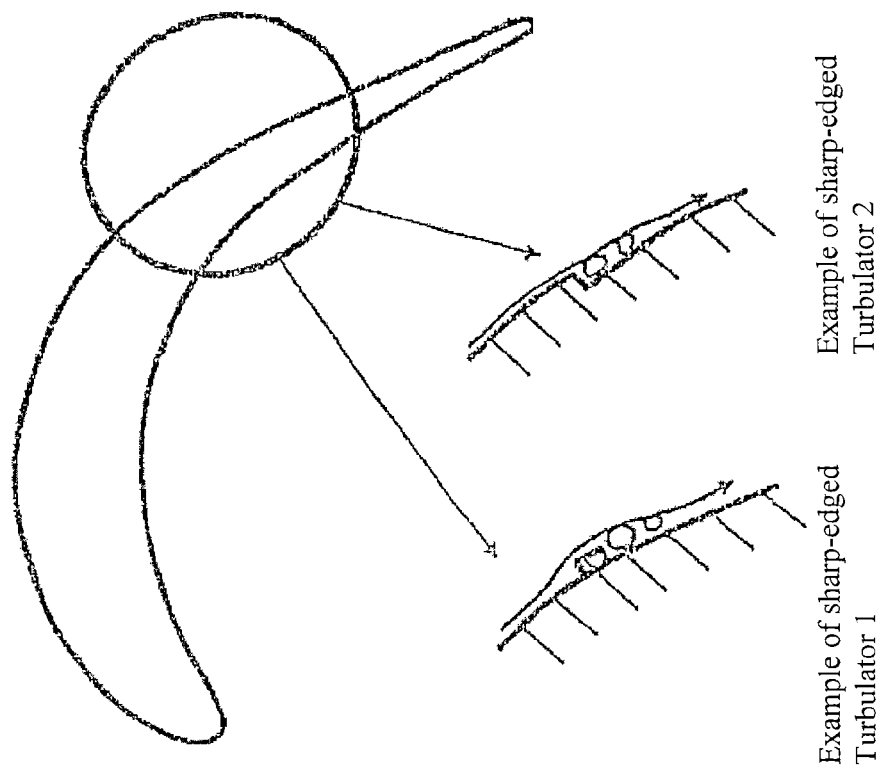
FIG. 2 shows two examples of a sharp-edged turbulator according to the prior art.
Figure 3:
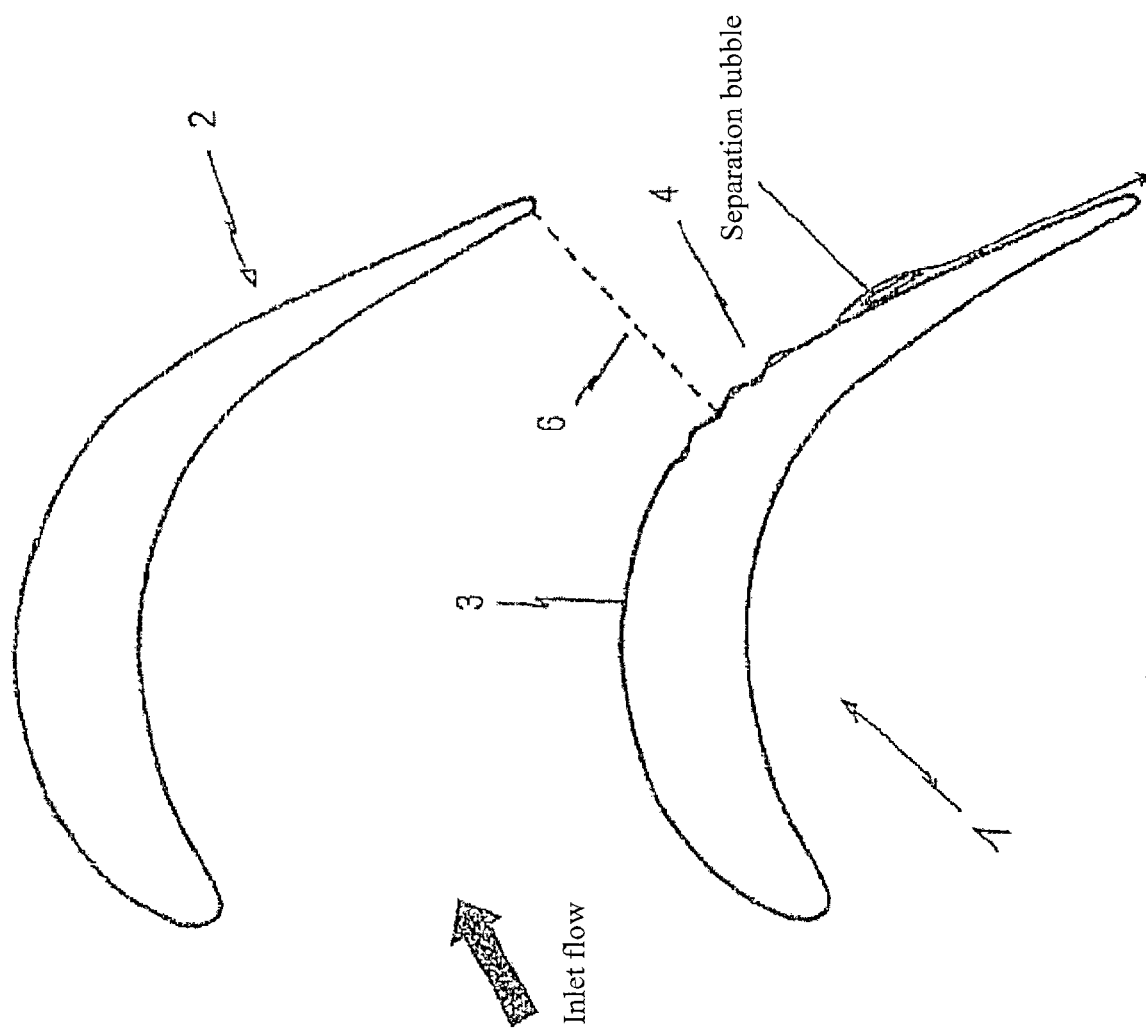
FIG. 3 shows a cross section of two adjacent blades of a blade array according to a preferred exemplary embodiment of the invention.
Figure 4:
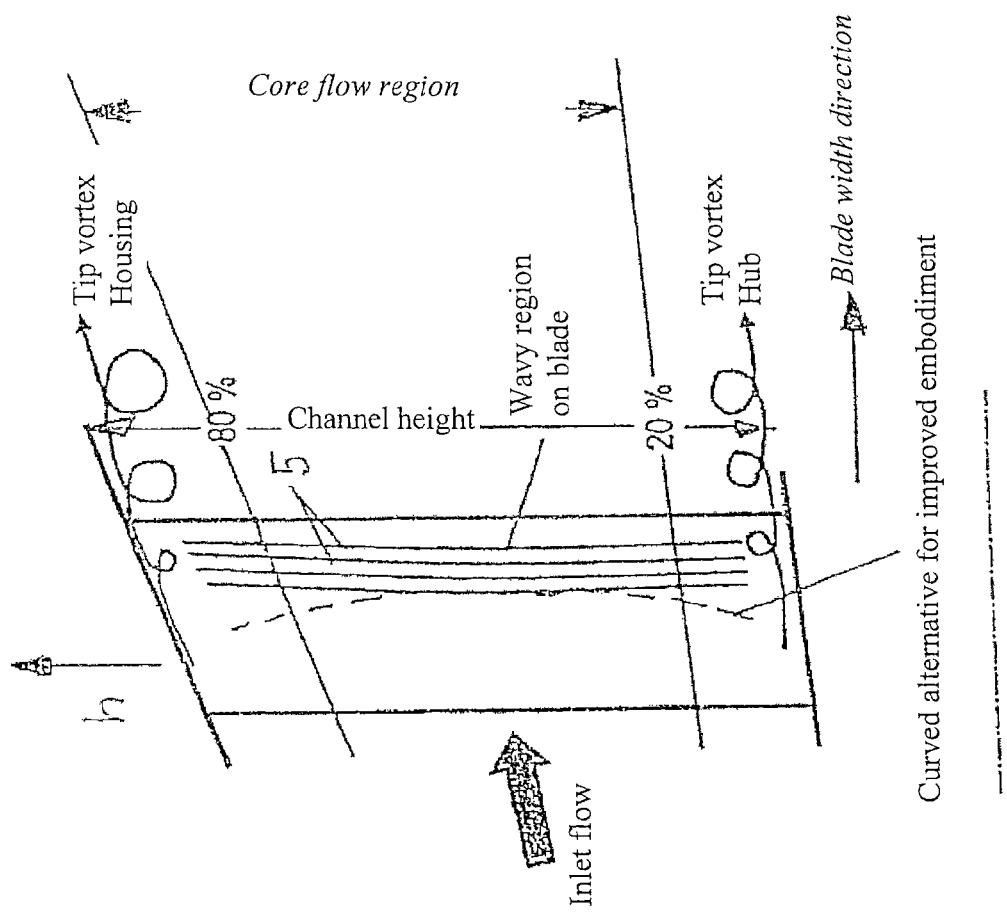
FIG. 4 shows a blade of the blade array in the meridian view.

FIG. 3 shows two adjacent blades 1, 2 of a turbo device, on whose inlet-side profile surface 3 a vortex generator 4 is arranged downstream from the speed maximum. The vortex generator 4 in the preferred exemplary embodiment is formed by a number of edgeless surface undulations, whose wave tails 5 run in the form of wave troughs and wave peaks predominantly in blade vertical direction h, as shown in FIG. 4. Furthermore, the waves 4 are arranged along the blade inlet side 3 in such a way that the flow is alternately lifted and dropped over these waves 4, i.e., the waves 4 run predominately in the flow direction (see FIG. 4) and extend in the blade vertical direction h at least in the core flow region according to FIG. 4 between 20% and 80% relative to the blade height.

As FIG. 3 also shows, the waves 4 have a sinusoidal shape, whose max. amplitudes are constant in the flow direction. However, it is also possible to vary the max. amplitude and/or the wavelength both in the blade vertical direction as well as in the width direction, preferably along the inlet side with increasing wavelength and increasing amplitude. Instead of a sine wave, an asymmetric wave shape may also be provided. The waves 4 in this case are arranged in a defined region on the inlet side 3. This region is located approximately at a channel narrow point 6 of the two adjacent blades 1, 2, i.e., in that region, in which the flow was accelerated up to a speed maximum and then deceleration occurs. The wave tails 5 (peaks/troughs) in this case run level in the blade vertical direction h and may extend over the entire blade height h or even only over a partial height where secondary vortex structures are lacking, as indicated in FIG. 4. In this case, they may have curved progressions in blade vertical direction h toward the secondary regions.

Along the axial extension of the blade (blade width direction), the waves 4 cover a partial region of the blade inlet side 3, typically a region in which the boundary layer can be destabilized up to the separation point of the separation bubble by the turbulator in the form of wave formation according to the invention in order to bring about a timely laminar-turbulent transition. Depending on the blade profile design, this region is between 40% and 90% of the axial blade width.

With respect to the dimensioning of the waves 4 (i.e., their max. amplitude and frequency), it turns out that the wave amplitude should not exceed a max. of 25%, advantageously approx. 5% of the wavelength in order to avoid a local separation of the boundary layer. The amplitudes and wavelengths can be optimized in this case analytically via instability observations of the boundary layer. The undulating vortex generators can be used both for stator blades as well as for rotor blades in particular of a low-pressure turbine.

Figure 5:
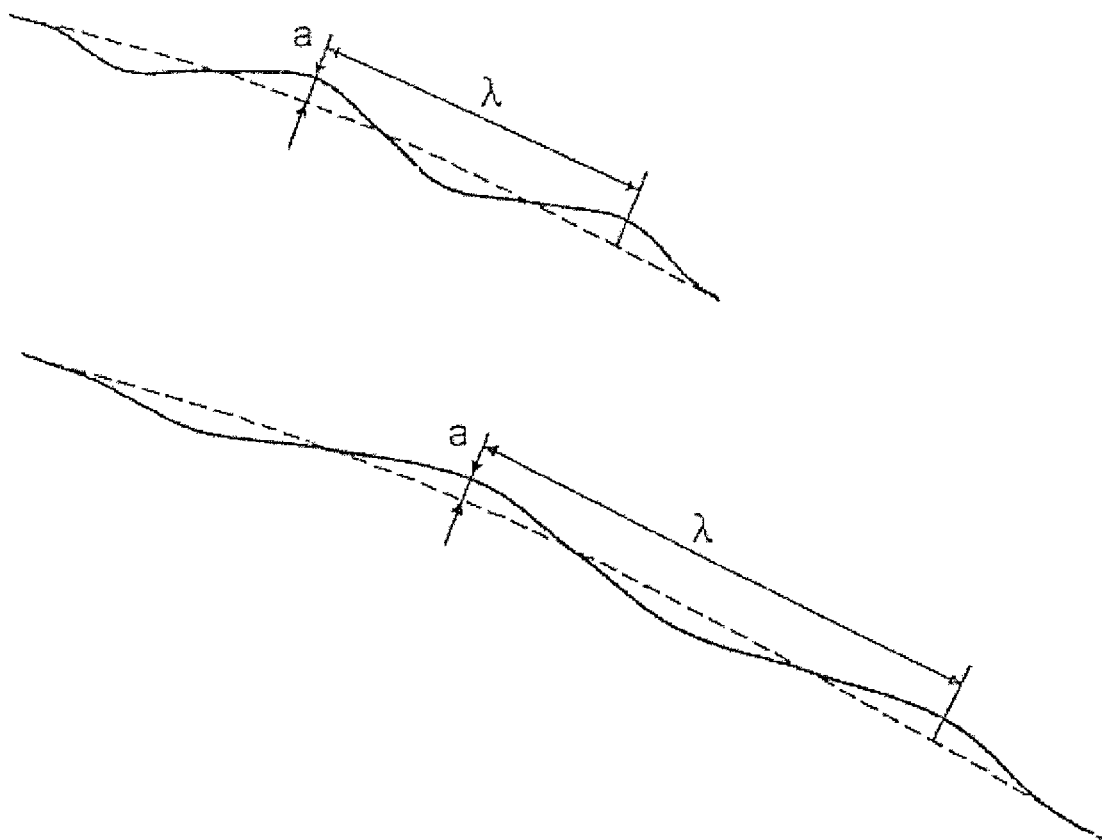
FIG. 5 shows a short and a long surface undulation.

Concerning this, FIG. 5 shows a shorter wave (in relation to amplitude a) with a ratio $a/\lambda$ of approx. 8% and a longer wave with a ratio $a/\lambda$ of approx. 5%.

The turbulator according to the invention is achieved in that the profile surface itself is modified along its blade inlet side 3 in sections to be a wave shape, for example by targeted casting during the blade fabrication or by subsequent machining work after the blade casting (e.g., ECM, PECM, grinding, milling, etc.), wherein the main characteristics of the wave shape form the missing sharp edges.

The invention claimed is:

1. A blade of a turbo device, comprising:
a profile having a pressure side and an inlet side, wherein an inlet-side profile surface has a geometric surface property;
wherein the geometric surface property is an edgeless surface undulation which is superimposed locally on the profile such that a wave peak forms an elevation on the profile and a wave trough forms a depression in the profile and wherein the elevation extends above the profile surface;
wherein the surface undulation merges into the profile continuously on an upstream end and a downstream end and the wave peak and the wave trough are in a blade vertical direction;
wherein a ratio of a wavelength to an inlet-side arc length is 0.005 to 0.25 and/or the ratio of an amplitude to the inlet-side arc length is 0.0002 to 0.0040;
and wherein the inlet-side profile surface includes a plurality of geometric surface properties and wherein, as viewed in a flow direction, alternately wave troughs and wave peaks or wave peaks and wave troughs follow one another.

2. The blade according to claim 1, wherein the wave has a sinusoidal shape or is configured to be asymmetrical.

3. The blade according to claim 1, wherein the geometric surface property extends between 20-80% of a height of the blade at least in a core flow range of the blade and follows a straight and/or a curved line with a constant and/or a varying amplitude and/or wavelength.

4. The blade according to claim 1, wherein the geometric surface property is arranged in relation to an adjacent blade in a region of a channel narrow surface.

5. The blade according to claim 1, wherein the plurality of geometric surface properties are arranged in a region of 40-90% of an axial width of the blade.

6. The blade according to claim 1, wherein the geometric surface property has a maximum amplitude which is 5% to 25% of the wavelength.

7. The blade according to claim 1, wherein the plurality of geometric surface properties have amplitudes that vary and increase in the flow direction.

8. The blade according to claim 1, wherein the wave peak and the wave trough run in the blade vertical direction at an angle of 45° to 135° to a meridian projection of a flow outside blade profile boundary layers.

* * * * *